(12) United States Patent
Yokoyama et al.

(10) Patent No.: US 11,820,398 B2
(45) Date of Patent: Nov. 21, 2023

(54) LEARNING APPARATUS AND MODEL LEARNING SYSTEM

(71) Applicant: TOYOTA JIDOSHA KABUSHIKI KAISHA, Toyota (JP)

(72) Inventors: Daiki Yokoyama, Gotemba (JP); Ryo Nakabayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 17/462,566

(22) Filed: Aug. 31, 2021

(65) Prior Publication Data

US 2022/0063658 A1 Mar. 3, 2022

(30) Foreign Application Priority Data

Sep. 3, 2020 (JP) .................................. 2020-148484

(51) Int. Cl.
*B60W 60/00* (2020.01)
*G07C 5/00* (2006.01)
*G06N 20/00* (2019.01)
*G06F 18/214* (2023.01)

(52) U.S. Cl.
CPC ......... *B60W 60/001* (2020.02); *G06F 18/214* (2023.01); *G06N 20/00* (2019.01); *G07C 5/008* (2013.01)

(58) Field of Classification Search
CPC ...... G07C 5/008; G06F 1/3206; G06N 3/082; G01C 21/2415; G08G 1/202

USPC .......................................................... 701/23
See application file for complete search history.

(56) References Cited

U.S. PATENT DOCUMENTS

| | | | |
|---|---|---|---|
| 2008/0274728 A1 | 11/2008 | Anderson et al. | |
| 2018/0309592 A1* | 10/2018 | Stolfus | H04L 43/062 |
| 2018/0373999 A1 | 12/2018 | Xu | |
| 2019/0212749 A1* | 7/2019 | Chen | B60W 30/00 |
| 2019/0311262 A1 | 10/2019 | Nagasaka et al. | |
| 2019/0311298 A1* | 10/2019 | Kopp | G01C 25/00 |
| 2019/0329771 A1* | 10/2019 | Wray | B60W 30/18163 |

FOREIGN PATENT DOCUMENTS

| | | | |
|---|---|---|---|
| JP | 2019-032821 A | 2/2019 | |
| JP | 2019-183698 A | 10/2019 | |
| JP | 2020093760 A | 6/2020 | |
| WO | WO-2019232335 A1 * | 12/2019 | ............ B60W 50/00 |

* cited by examiner

*Primary Examiner* — Logan M Kraft
*Assistant Examiner* — Joshua Campbell
(74) *Attorney, Agent, or Firm* — Dinsmore & Shohl LLP

(57) ABSTRACT

A learning apparatus configured to be able to communicate with a plurality of equipment in which learning models are mounted, wherein when first equipment among the plurality of equipment in which a learning model trained using training data sets acquired in a predetermined first area is mounted and which is controlled by the same is used in a predetermined second area, the learning apparatus uses training data sets acquired in the second area to relearn the learning model mounted in the first equipment.

2 Claims, 5 Drawing Sheets

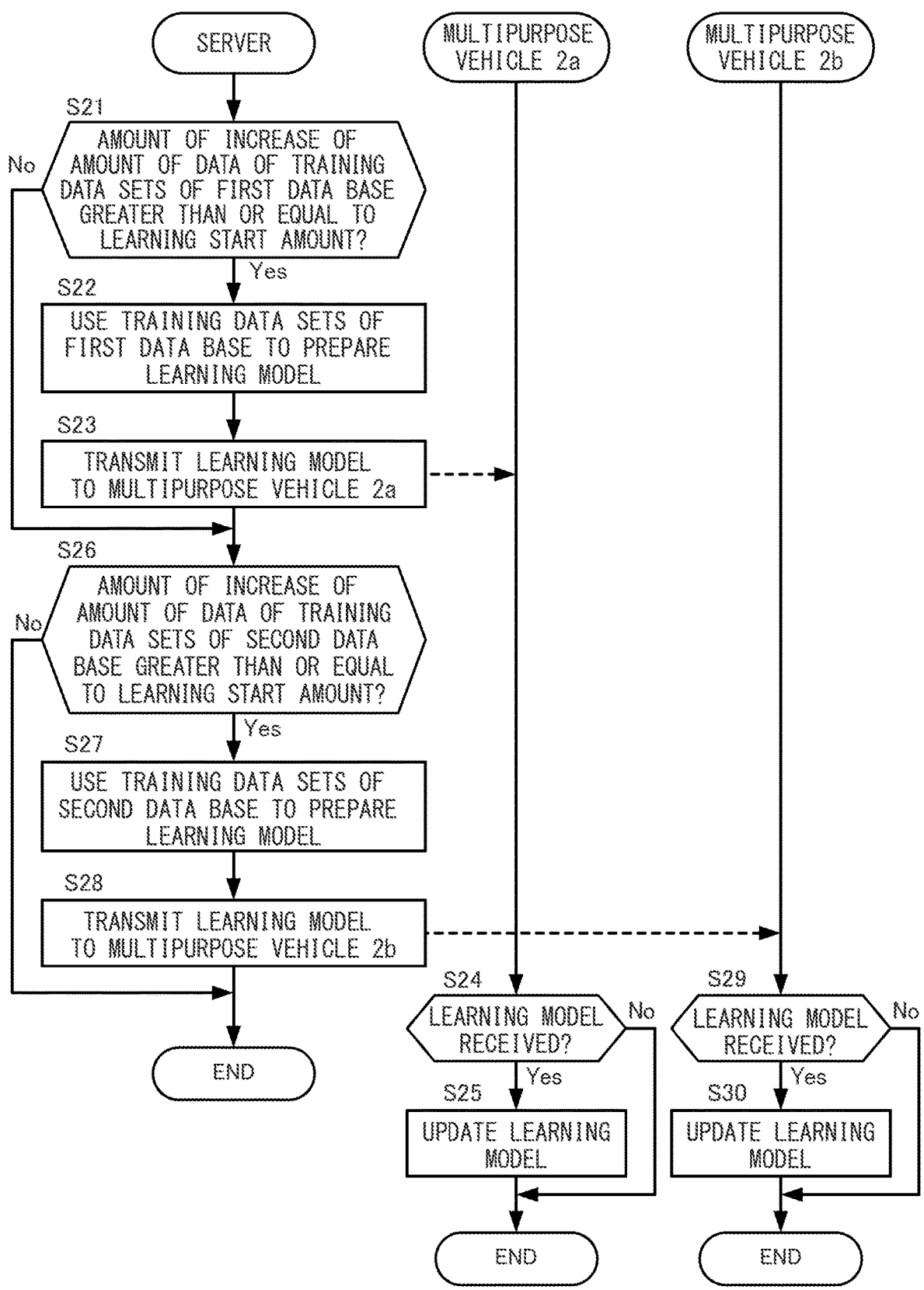

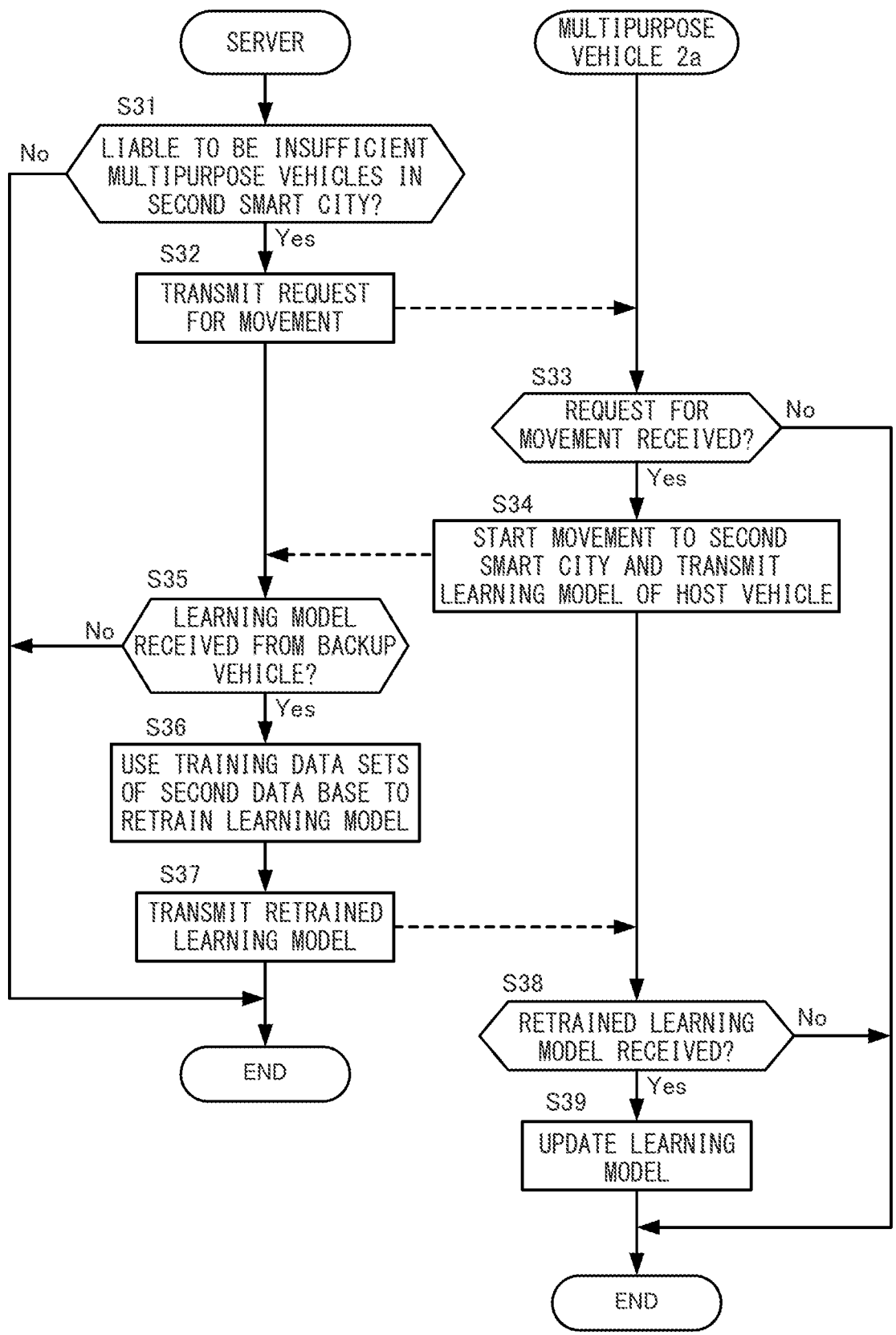

LEARNING APPARATUS AND MODEL LEARNING SYSTEM

CROSS-REFERENCE TO RELATED APPLICATIONS

This application claims priority to Japanese Patent Application No. 2020-148484 filed on Sep. 3, 2020, which is incorporated herein by reference in its entirety.

FIELD

The present disclosure relates to a learning apparatus and a model learning system.

BACKGROUND

Japanese Unexamined Patent Publication No. 2019-183698 discloses using a learning model such as for example a neural network model learned at a server or vehicle to estimate a temperature of an exhaust purification catalyst of an internal combustion engine mounted in a vehicle.

SUMMARY

It may be considered to mount a learning model in various types of mobile or portable equipment able (for example, vehicles and other transport equipment or smartphones or other portable equipment) to control that equipment. Even in mobile or portable equipment, the area in which the equipment is used is usually limited to a certain extent. In the case for example of a vehicle, a typical example of transport equipment, if a private car, basically it is used in the sphere of daily life of the owner of the private car. If a commercial vehicle of a taxi, bus, and multipurpose vehicle for mobility services, basically it is used in the service area of the business owning the commercial vehicle. Further, if a smartphone, a typical example of portable equipment, basically it is used in the sphere of daily life of the owner.

Therefore, when learning a learning model used in the equipment, by learning using suitable training data sets corresponding to the properties of the usage area in which the equipment is routinely used, it is possible to generate a high precision learning model optimized corresponding to the properties of the usage area in which the equipment is used.

However, in the case of mobile or portable equipment, sometimes the equipment will be used in another area different from the usual usage area (for example, travel destination or new home, temporary dispatch location of multipurpose vehicle, etc.) In this case, since a learning model of equipment is a learning model optimized corresponding to the properties of the usual usage area and has not been learned reflecting the properties of other areas, if used in another area different from the usual usage area, the precision of the learning model is liable to fall.

The present disclosure was made focusing on such a problem and has as its object to keep the precision of a learning model from falling when equipment in which the learning model is mounted is used in an area different from the usual usage area.

To solve this technical problem, the learning apparatus according to one aspect of the present disclosure is configured to be able to communicate with a plurality of equipment in which learning models are mounted. Further, the learning apparatus is configured so that when, among the plurality of equipment, first equipment in which a learning model learned using training data sets acquired in a predetermined first area is mounted and which is controlled by the same is used in a predetermined second area, the training data sets acquired in the second area are used to relearn the learning model mounted in the first equipment.

Further, the model learning system according to one aspect of the present disclosure comprises a server and a plurality of equipment configured to be able to communicate with the server. Further, it is configured so that when, among the plurality of equipment, first equipment in which a learning model learned using training data sets acquired in a predetermined first area is mounted and which is controlled by the same is used in a predetermined second area, the server uses the training data sets acquired in the second area to relearn the learning model.

According to these aspects of the present disclosure, it is possible to keep the precision of the learning model from falling even if equipment in which the learning model is mounted is used in an area different from the usual usage area.

BRIEF DESCRIPTION OF DRAWINGS

FIG. 5 is a flow chart showing one example of processing performed between a server and a multipurpose vehicle in a first smart city and a second smart city for generating a suitable learning model corresponding to the properties of the smart cities.

FIG. 6 is a flow chart showing one example of processing performed between a server and a multipurpose vehicle in a first smart city when there are insufficient or there are liable to be insufficient multipurpose vehicles in a second smart city.

DESCRIPTION OF EMBODIMENTS

Figure 1:
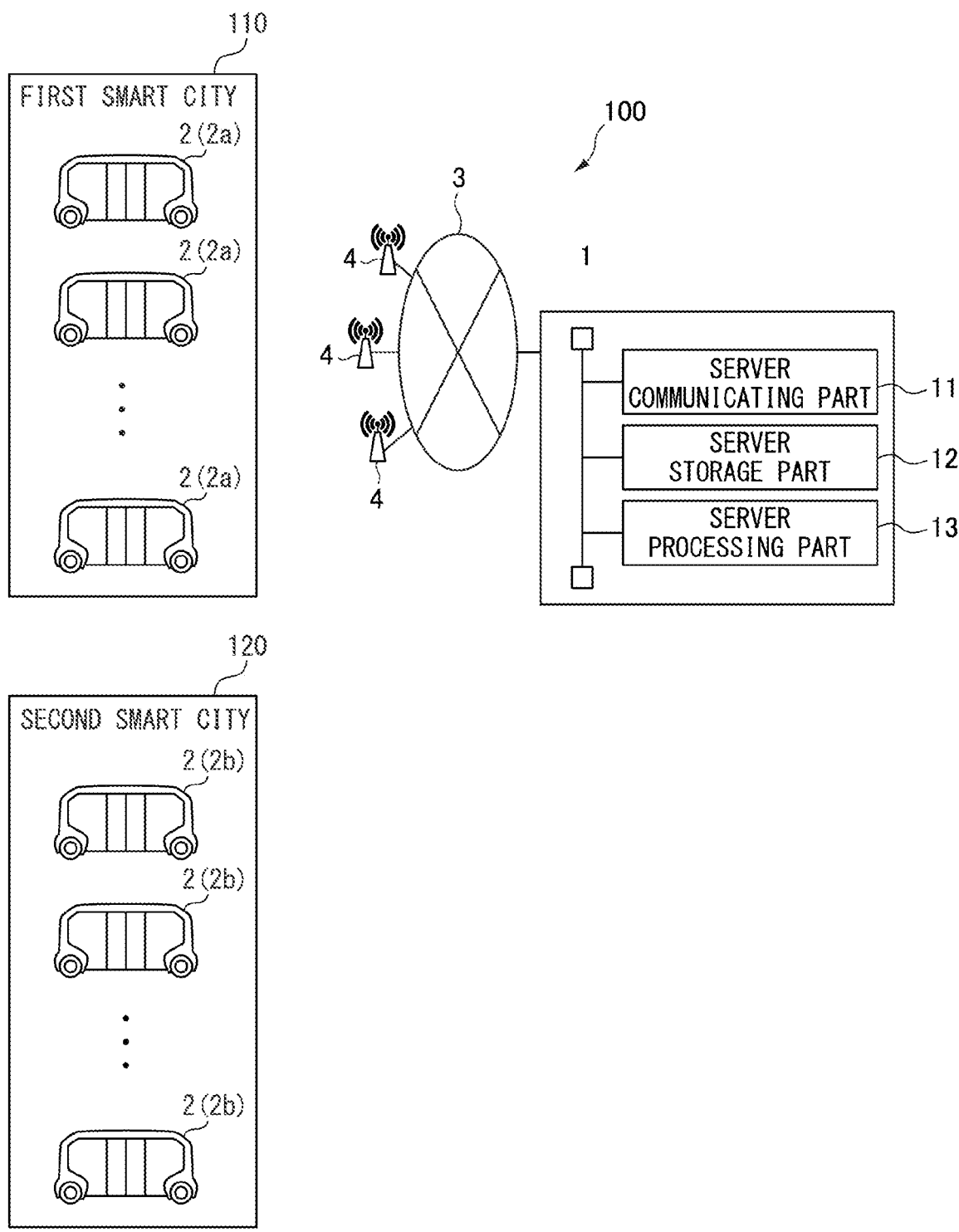
FIG. 1 is a schematic view of the configuration of a model learning system according to one embodiment of the present disclosure.

Below, referring to the drawings, an embodiment of the present disclosure will be explained in detail. Note that, in the following explanation, similar component elements will be assigned the same reference notations.

FIG. 1 is a schematic view of the configuration of a model learning system 100 according to one embodiment of the present disclosure.

The model learning system 100 according to the present embodiment comprises a server 1 and a plurality of vehicles 2 as examples of mobile or portable equipment.

The server 1 is provided with a server communicating part 11, a server storage part 12, and a server processing part 13.

The server communicating part 11 is a communication interface circuit for connecting the server 1 with a network 3 through for example a gateway etc. and is configured to enable two-way communication with the vehicles 2.

The server storage part 12 has an HDD (hard disk drive) or optical recording medium, semiconductor memory, or other storage medium and stores the various types of computer programs and data etc. used for processing at the server processing part 13.

The server processing part 13 has one or more processors and their peripheral circuits. The server processing part 13 runs various types of computer programs stored in the server storage part 12 and comprehensively controls the overall operation of the server 1 and is, for example, a CPU (central processing unit).

The vehicles 2 in the present embodiment are multipurpose vehicles for mobility services used for multiple applications such as transport, physical distribution, physical sales, etc. and are configured so that driving operations relating to acceleration, steering, and braking are automatically performed. Further, in the present embodiment, the vehicles 2 are linked with a specific smart city such as shown in FIG. 1 (in the present embodiment, a first smart city 110 or second smart city 120) and basically is used inside the linked smart city.

Below, for convenience, vehicles 2 linked with the first smart city 110 and basically used inside the first smart city 110 will be referred to as "first multipurpose vehicles 2a" in accordance with need, while vehicles 2 linked with the second smart city 120 and basically used inside the second smart city 120 will be referred to as "second multipurpose vehicles 2b" in accordance with need. Note that the vehicles 2 may be vehicles provided with only internal combustion engines as the power sources or may be hybrid vehicles or plug-in hybrid vehicles or electrically driven vehicles (electric vehicles, fuel cell vehicles, etc.)

Figure 2:
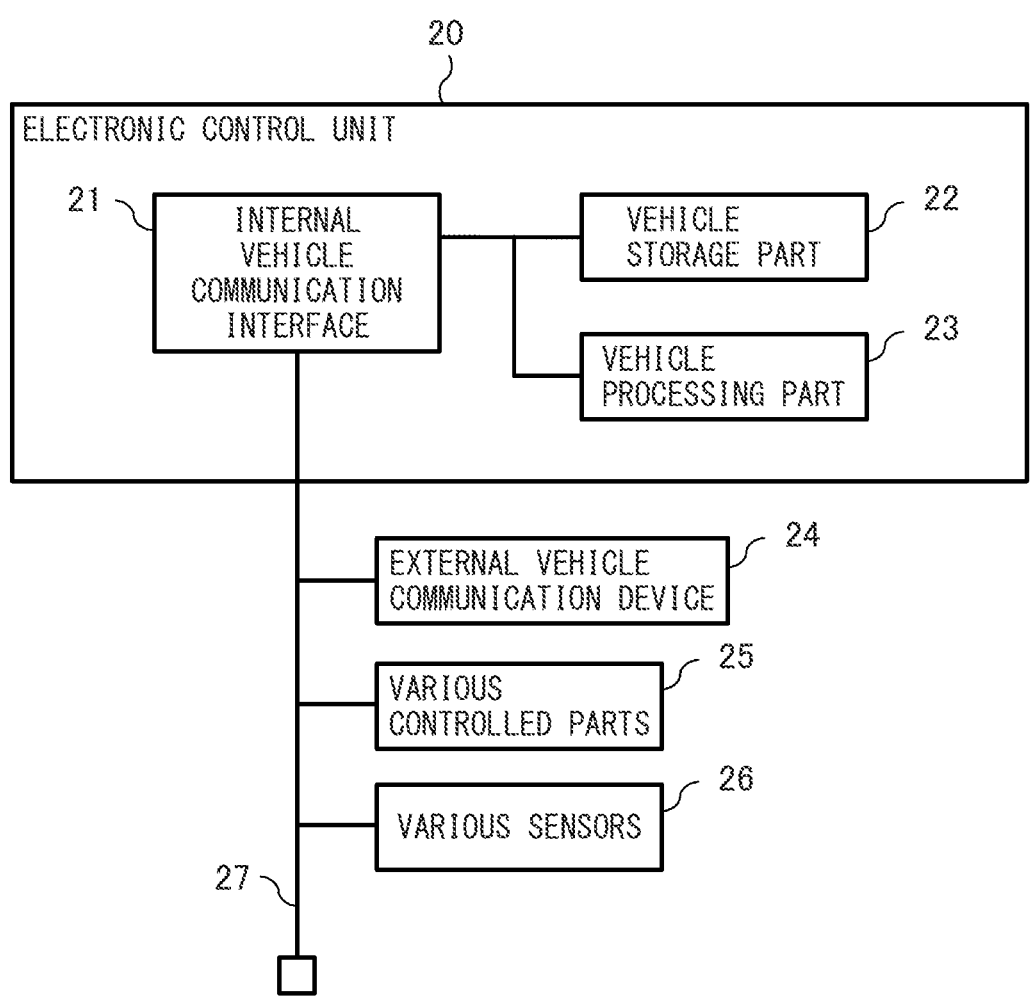
FIG. 2 is a schematic view showing part of a hardware configuration of a vehicle according to one embodiment of the present disclosure.

FIG. 2 is a schematic view showing part of a hardware configuration of a vehicle 2.

The vehicle 2 is provided with an electronic control unit 20, external vehicle communication device 24, for example an internal combustion engine or electric motor, an air conditioner or other various types of controlled parts 25 mounted in the vehicle 2, and various types of sensors 26 required for controlling the various types of controlled parts 25 or detecting measured values of input parameters and output parameters of the later explained learning model. The electronic control unit 20, external vehicle communication device 24, and various types of controlled parts 25 and sensors 26 are connected through an internal vehicle network 27 based on the CAN (Controller Area Network) or other standard.

The electronic control unit 20 is provided with an interior vehicle communication interface 21, vehicle storage part 22, and vehicle processing part 23. The interior vehicle communication interface 21, vehicle storage part 22, and vehicle processing part 23 are connected with each other through signal wires.

The interior vehicle communication interface 21 is a communication interface circuit for connecting the electronic control unit 20 to the internal vehicle network 27 based on the CAN (Controller Area Network) or other standard.

The vehicle storage part 22 has an HDD (hard disk drive) or optical recording medium, semiconductor memory, or other storage medium and stores the various types of computer programs and data etc. used for processing at the vehicle processing part 23.

The vehicle processing part 23 has one or more processors and their peripheral circuits. The vehicle processing part 23 runs various types of computer programs stored in the vehicle storage part 22, comprehensively controls the various types of controlled parts mounted in the vehicle 2, and is, for example, a CPU.

The external vehicle communication device 24 is a vehicle-mounted terminal having a wireless communication function. The external vehicle communication device 24 accesses a wireless base station 4 (see FIG. 1) connected with the network 3 (see FIG. 1) through a not shown gateway etc. and is connected with the network 3 through the wireless base station 4. Due to this, two-way communication is performed with the server 1.

In each vehicle 2, in controlling the various types of controlled parts 25 mounted in the vehicle 2, for example, a learning model learned by machine learning etc. (artificial intelligence model) is used in accordance with need. In the present embodiment, as a learning model, a neural network model using a deep neural network (DNN), convolutional neural network (CNN), etc. (below, referred to as an "NN model") learned by deep learning is used. Therefore, a learning model according to the present embodiment can be said to be an NN model trained by deep learning. "Deep learning" is one of the machine learning techniques such as artificial intelligence (AI).

Figure 3:
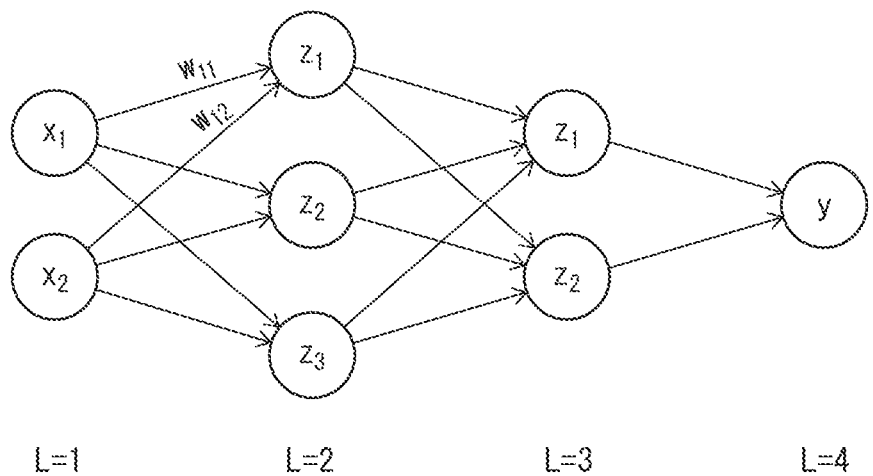
FIG. 3 is a view showing one example of a learning model according to one embodiment of the present disclosure.

FIG. 3 is a view showing one example of a learning model according to the present embodiment (NN model).

The circle marks in FIG. 3 show artificial neurons. The artificial neurons are usually called "nodes" or "units" (in the Description, they are called "nodes"). In FIG. 3, L=1 indicates an input layer, L=2 and L=3 indicate hidden layers, and L=4 indicates an output layer. The hidden layers are also called "intermediate layers". Note that, FIG. 3 illustrates an NN model with two hidden layers, but the number of hidden layers is not particularly limited. Further, the numbers of nodes of the layers of the input layer, hidden layers, and output layer are also not particularly limited.

In FIG. 3, $x_1$ and $x_2$ show the nodes of the input layer (L=1) and output values from the nodes while "y" shows the node of the output layer (L=4) and its output value. Similarly, $z_1^{(L=2)}$, $z_2^{(L=2)}$, and $z_3^{(L=2)}$ show nodes of the hidden layer (L=2) and output values from the nodes, while $z_1^{(L=3)}$ and $z_2^{(L=3)}$ show nodes of the hidden layer (L=3) and output values from the nodes.

At the nodes of the input layer, the inputs are output as they are. On the other hand, at the nodes of the hidden layer (L=2), output values $x_1$ and $x_2$ of the nodes of the input layer are input, while at the nodes of the hidden layer (L=2), the corresponding weights "w" and biases "b" are used to calculate sum input values "u". For example, in FIG. 3, a sum input value $u_k^{(L=2)}$ calculated at the node shown by $z_k^{(L=2)}$ (k=1, 2, 3) of the hidden layer (L=2) becomes like in the following formula (M is the number of nodes of the input layer).

$$u_k^{(L=2)} = \sum_{m=1}^{M} \left(x_m \cdot w_{loss}^{(L=2)}\right) + b_k \qquad \text{[Mathematical 1]}$$

Next, this sum input value $u_k^{(L=2)}$ is converted by an activation function "f" and output as the output value $z_k^{(L=2)}(=f(u_k^{(L=2)}))$ from the node shown by $z_k^{(L=2)}$ of the hidden layer (L=2). On the other hand, the nodes of the hidden layer (L=3) receive input of the output values $z_1^{(L=2)}$, $z_2^{(L=2)}$, and $z_3^{(L=2)}$ of the nodes of the hidden layer (L=2). At the nodes of the hidden layer (L=3), the respectively corresponding weights "w" and biases "b" are used to calculate the sum input values $u(=\Sigma z \cdot w + b)$. The sum input values "u" are converted by an activation function in the same way and are output as the output values $z_1^{(L=3)}$ and $z_2^{(L=3)}$ from the nodes of the hidden layer (L=3). The activation function is, for example, a Sigmoid function σ.

Further, at the node of the output layer (L=4), the output values $z_1^{(L=3)}$ and $z_2^{(L=3)}$ of the nodes of the hidden layer (L=3) are input. At the node of the output layer, the respectively corresponding weights "w" and biases "b" are used to calculate the sum input value u(Σz·w+b) or only the respectively corresponding weights "w" are used to calculate the sum input value u(Σz·w). For example, at the node of the output layer, an identity function is used as the activation function. In this case, the sum input value "u" calculated at the node of the output layer is output as is as the output value "y" from the output layer.

In this way, the learning model according to the present embodiment is provided with an input layer, hidden layers, and an output layer. If one or more input parameters are input from the input layer, one or more output parameters corresponding to the input parameters are output from the output layer.

As examples of input parameters, for example, if using the learning model to control an air-conditioner mounted in the vehicle 2, the outside air temperature or usage location of the vehicle 2 (latitude and longitude), date and time, immediately preceding parking time (parking time before driving) and other such various parameters having an effect on the inside vehicle temperature may be mentioned. Further, as an example of the output parameter corresponding to such input parameters, a temperature setting of the air-conditioner may be mentioned. Due to this, by controlling the air-conditioner so as to become a temperature setting acquired as the output parameter, it is possible to maintain the inside vehicle temperature at a suitable temperature.

Further, as examples of the input parameters, for example, if using the learning model to control an internal combustion engine mounted in a vehicle 2, current values of an engine rotational speed or engine cooling water temperature, amount of fuel injection, fuel injection timing, fuel pressure, amount of intake air, intake air temperature, EGR rate, supercharging pressure, and other such various types of parameters showing the operating state of the internal combustion engine may be mentioned. Further, as examples of output parameters corresponding to such input parameters, estimated values of a $CO_2$ concentration or NOx concentration in the exhaust, a concentration of other substances, engine output torque, or other various parameters showing performance of the internal combustion engine may be mentioned. Due to this, since it is possible to input current values of various parameters showing the operating state of the internal combustion engine as input parameters into the NN model so as to acquire estimated values of various parameters showing the performance of the internal combustion engine (current estimated values or future estimated values) as output parameters, for example, it is possible to control the internal combustion engine based on the output parameters so that the performance of the internal combustion engine approaches the desired performance. Further, if provided with sensors for measuring the output parameters etc., it is also possible to judge malfunction of the internal combustion engine or sensors etc. by the difference of the measured values and estimated values.

To improve the precision of a learning model, it is necessary to learn the learning model. For learning a learning model, a large number of training data sets including measured values of input parameters and measured values of output parameters (truth data) corresponding to the measured values of the input parameters are used. By using a large number of training data sets to repeatedly update the values of the weights "w" and biases "b" of the neural network by known error backpropagation, the values of the weights "w" and biases "b" are learned and the precision of the learning model is improved.

Here, for example, in the case of a vehicle 2 such as a first multipurpose vehicle 2a or a second multipurpose vehicle 2b where basically the usage area is determined, by using suitable training data sets corresponding to the properties of the usage area of the vehicle 2 (for example, the weather in the area, the terrain, the environmental standards, age groups of the residents, etc.) to learn the learning model used at the vehicle 2, it is possible to generate a learning model optimized corresponding to the properties of the usage area of the vehicle 2.

Due to this, by inputting input parameters into the learning model, it is possible to obtain suitable output parameters corresponding to the properties of the usage area. For this reason, for example, if controlling an air-conditioner, it is possible to maintain the inside vehicle temperature at a suitable temperature corresponding the properties of the usage area. Further, if controlling the internal combustion engine, it is possible for example to control the concentration of $CO_2$ or concentration of NOx etc. in the exhaust to a suitable concentration corresponding to the properties of the usage area.

For this reason, in the present embodiment, the vehicles 2 mount learning models learned using suitable training data sets corresponding to the usage areas of the vehicles 2. Specifically, the first multipurpose vehicles 2a mount learning models learned using training data sets acquired in the first smart city 110 while the second multipurpose vehicles 2b mount learning models learned using training data sets acquired in the second smart city 120.

However, for example, if an event is scheduled to be held in the second smart city 120 and demand for multipurpose vehicles in the second smart city 120 is expected to temporarily increase etc., it may be considered for some reason or another to temporarily make the first multipurpose vehicles 2a move to the second smart city 120 to be used in the second smart city 120.

In this regard, however, the learning models of the first multipurpose vehicles 2a are learning models optimized corresponding to the properties of the first smart city 110. They have not been learned reflecting the properties of the second smart city 120, so if using the first multipurpose vehicles 2a in the second smart city 120, even if inputting the input parameters to the learning models, it is liable to be unable to obtain values of suitable output parameters corresponding to the input parameters.

Therefore, in the present embodiment, if due to some reason or another, the first multipurpose vehicles 2a come to be used in the second smart city 120, the learning models mounted in the first multipurpose vehicles 2a are relearned using suitable training data sets corresponding to properties of the second smart city 120. Due to this, it is possible to update the learning models of the first multipurpose vehicles 2a to learning models corresponding to the second smart city 120 as well, so it is possible to obtain values of the suitable output parameters corresponding to the input parameters through the learning models when using the first multipurpose vehicles 2a in the second smart city 120.

Figure 4:
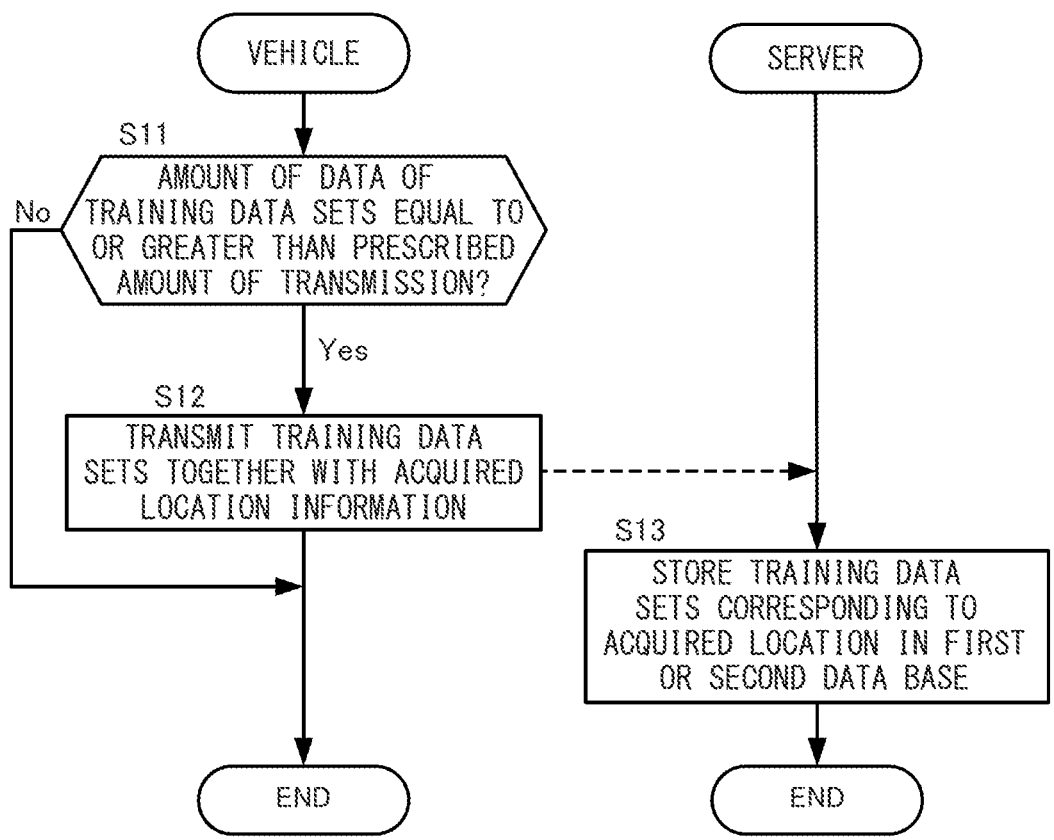
FIG. 4 is a flow chart showing one example of processing performed between a server and a vehicle for acquiring suitable training data sets corresponding to the properties of a "smart city".

FIG. 4 is a flow chart showing one example of processing performed between the server 1 and a vehicle 2 (multipurpose vehicle 2a and multipurpose vehicle 2b) in the model learning system 100 according to the present embodiment so as to obtain suitable training data sets corresponding to the properties of the smart cities 110 and 120.

At step S11, the electronic control unit 20 of the vehicle 2 judges if the amount of data of the training data sets stored in the vehicle storage part 22 has become greater than or equal to a predetermined amount of transmission. If the amount of data of the training data sets has become greater than or equal to the predetermined amount of transmission, the electronic control unit 20 proceeds to the processing of step S12. On the other hand, if the amount of data of the training data sets is less than the predetermined amount of transmission, the electronic control unit 20 ends the current processing.

Note that, in the present embodiment, the electronic control unit 20 of the vehicle 2 acquires training data sets (measured values of input parameters and measured values of output parameters of learning model) at any time while the vehicle is running and stores the acquired training data sets linked with the acquired location information (in the present embodiment, first smart city 110 or second smart city 120) at the vehicle storage part 22.

At step S12, the electronic control unit 20 of the vehicle 2 transmits the training data sets together with the acquired location information to the server 1 and, after transmission, deletes the data of the training data sets which had been stored in the vehicle storage part 22.

At step S13, if receiving training data sets from the vehicle 2, the server 1 stores the training data sets in a predetermined data base of the server storage part 12 in accordance with the acquired location of the training data sets. In the present embodiment, the server 1 stores the training data sets acquired in the first smart city 110 in a first data base and stores the training data sets acquired in the second smart city 120 in a second data base.

FIG. 5 is a flow chart showing an example of processing performed between the server 1 and a multipurpose vehicle 2a and a multipurpose vehicle 2b so as to generate suitable learning models corresponding to the properties of the smart cities 110 and 120 in the model learning system 100 according to the present embodiment.

At step S21, the server 1 judges if the amount of increase of the amount of data of the training data sets stored in the first data base from when using the training data sets stored in the first data base the previous time has become greater than or equal to a predetermined learning start amount. If the amount of increase of the amount of data of the training data sets stored in the first data base becomes greater than or equal to the learning start amount, the server 1 proceeds to the processing of step S22. On the other hand, if the amount of increase of the amount of data of the training data sets stored in the first data base is less than the learning start amount, the server 1 proceeds to the processing of step S26.

At step S22, the server 1 newly prepares a learning model learned using the most recent learning start amount of the training data sets stored in the first data base.

At step S23, the server 1 transmits the newly prepared learning model to the multipurpose vehicle 2a being used in the first smart city 110.

At step S24, the electronic control unit 20 of the multipurpose vehicle 2a judges if it has received a new learning model from the server 1. If receiving a new learning model from the server 1, the electronic control unit 20 of the multipurpose vehicle 2a proceeds to the processing of step S25. On the other hand, if not receiving a new learning model from the server 1, the electronic control unit 20 of the multipurpose vehicle 2a ends the current processing.

At step S25, the electronic control unit 20 of the multipurpose vehicle 2a updates the learning model which had been used in its host vehicle to the new learning model received from the server 1, that is, the learning model learned using the most recent predetermined amount (learning start amount) of training data sets acquired in the first smart city 110 and thereby optimized corresponding to the latest properties of the first smart city 110.

At step S26, the server 1 judges if the amount of increase of the amount of data of the training data sets stored in the second data base from when learning using the training data sets stored in the second data base the previous time has become greater than or equal to the learning start amount. If the amount of increase of the amount of data of the training data sets stored in the second data base becomes greater than or equal to the learning start amount, the server 1 proceeds to the processing of step S27. On the other hand, if the amount of increase of the amount of data of the training data sets stored in the second data base is less than the learning start amount, the server 1 ends the current processing.

At step S27, the server 1 newly prepares a learning model learned using the most recent learning start amount of training data sets stored in the second data base.

At step S28, the server 1 transmits the newly prepared learning model to the multipurpose vehicle 2b being used in the second smart city 120.

At step S29, the electronic control unit 20 of the multipurpose vehicle 2b judges if it has received a new learning model from the server 1. If it has received a new learning model from the server 1, the electronic control unit 20 of the multipurpose vehicle 2b proceeds to the processing of step S30. On the other hand, if it has not received a new learning model from the server 1, the electronic control unit 20 of the multipurpose vehicle 2b ends the current processing.

At step S30, the electronic control unit 20 of the multipurpose vehicle 2b updates the learning model which had been used in its host vehicle to the new learning model received from the server 1, that is, the learning model learned using the most recent predetermined amount of data (learning start amount) of training data sets acquired in the second smart city 120 and thereby optimized corresponding to the latest properties of the second smart city 120.

FIG. 6 is a flow chart showing one example of processing performed between the server 1 and a multipurpose vehicle 2a when in the model learning system 100 according to the present embodiment, there are insufficient or liable to be insufficient multipurpose vehicles in the second smart city 120.

At step S31, the server 1 judges if there are insufficient or liable to be insufficient multipurpose vehicles in the second smart city 120. The method of judging if there are insufficient or liable to be insufficient multipurpose vehicles in the second smart city 120 is not particularly limited, but, for example, it is possible to judge this by obtaining a grasp of the state of congestion in the second smart city 120 based on human flow data used for obtaining a grasp of movement of people etc. If there are insufficient or liable to be insufficient multipurpose vehicles in the second smart city 120, the server 1 proceeds to the processing of step S32. On the other hand, if there are not insufficient or not liable to be insufficient multipurpose vehicles in the second smart city 120, the server 1 ends the current processing.

At step S32, the server 1 selects from among the multipurpose vehicles 2a in the first smart city 110 the necessary number of vehicles able to be made to temporarily move to and operate in the second smart city 120 (below, referred to as "backup vehicles") and transmit a request for movement to the selected backup vehicles (multipurpose vehicles 2a).

At step S33, the electronic control unit 20 of a multipurpose vehicle 2a judges if it has received a request for movement. If receiving a request for movement, the electronic control unit 20 of the multipurpose vehicle 2a proceeds to the processing of step S34, while if not receiving a request for movement, it ends the current processing.

At step S34, the electronic control unit 20 of the multipurpose vehicle 2a makes the host vehicle move toward the second smart city 120 of the request for movement based on the request for movement and transmits the learning model of the host vehicle to the server 1.

At step S35, the server 1 judges if it has received a learning model from a backup vehicle (that is, a multipurpose vehicle 2a transmitting a request for movement). If receiving a learning model from a backup vehicle, the server 1 proceeds to the processing of step S36. On the other hand, if not receiving a learning model from a backup vehicle, the server 1 ends the current processing.

At step S36, the server 1 uses the most recent predetermined amount of data (for example, learning start amount) of training data sets acquired in the second smart city 120 stored in the second data base (that is, suitable training data sets corresponding to the properties of the second smart city 120) to relearn the learning model of the backup vehicle.

Regarding the relearning at that time, it is possible to relearn the values of the weights "w" and biases "b" of the nodes of the hidden layers of the learning model for the entire learning model of the backup vehicle in the relearning or possible to use part of the learning model of the backup vehicle as is and relearn the remaining part as transfer learning to thereby use the values of the weights "w" and biases "b" of the nodes of some of the hidden layers among the hidden layers as they are and relearn only the values of the weights "w" and biases "b" of the nodes of the remaining part of the hidden layers.

If performing transfer learning at the time of relearning, it is possible to decrease the amount of processing required for relearning to shorten the time required for relearning. Therefore, for example, it is possible to judge whether to perform usual learning relearning the entire learning model of the backup vehicle at the time of relearning or whether to perform transfer learning in accordance with the number of the backup vehicles so as to perform transfer learning when there are greater than a predetermined number of the backup vehicles.

At step S37, the server 1 transmits the relearned learning model to the backup vehicle which had transmitted that learning model.

At step S38, the electronic control unit 20 of the multipurpose vehicle 2a judges if it has received a learning model relearned at the server 1. If receiving a learning model relearned at the server 1, the electronic control unit 20 of the multipurpose vehicle 2a proceeds to the processing of step S39. On the other hand, if not receiving a learning model relearned at the server 1, the electronic control unit 20 of the multipurpose vehicle 2a ends the current processing.

At step S39, the electronic control unit 20 of the multipurpose vehicle 2a updates the learning model to the learning model relearned at the server 1. Due to this, it is possible to update the learning model of a multipurpose vehicle 2a dispatched to the second smart city 120 as a backup vehicle to a learning model corresponding to the second smart city 120 as well, so when using the first multipurpose vehicle 2a at the second smart city 120, it is possible to obtain values of suitable output parameters corresponding to the input parameters through the learning model.

Note that if, in the first smart city 110, there are insufficient or liable to be insufficient multipurpose vehicles, it is sufficient to perform processing similar to the processing shown in FIG. 6 between the server 1 and a multipurpose vehicle 2b.

The above-explained model learning system 100 according to the present embodiment is comprised of a server 1 functioning as a learning apparatus and a plurality of vehicles 2 (equipment) configured to be able to communicate with the server 1. Further, the server 1 is configured so that when a first multipurpose vehicle 2a (first equipment) among a plurality of vehicles 2 in which a learning model learned using the training data sets acquired at the first smart city 110 (predetermined first area) is mounted and which is controlled by the same is used in the second smart city 120 (predetermined second area), it uses the training data sets acquired at the second smart city 120 to relearn the learning model of the first multipurpose vehicle 2a.

Due to this, the learning model of the first multipurpose vehicle 2a can be updated to a learning model corresponding to the second smart city 120 as well, so when using the first multipurpose vehicle 2a at the second smart city 120, it is possible to obtain values of suitable output parameters corresponding to the input parameters through the learning model. Therefore, even when using the first multipurpose vehicle 2a in the second smart city 120 different from the first smart city 110 of the usual usage area, it is possible to keep the precision of the learning model from falling.

Further, in the present embodiment, the first multipurpose vehicle 2a is a self driving vehicle in which driving operations relating to acceleration, steering, and braking are automatically performed. It is configured so that when receiving a request for movement from the first smart city 110 to the second smart city 120 from the server 1, based on the request for movement, it makes the first multipurpose vehicle 2a move from the first smart city 110 to the second smart city 120 and transmits the learning model mounted in the first multipurpose vehicle 2a to the server 1. Further, the server 1 is configured so that when receiving a learning model from the first multipurpose vehicle 2a transmitting the request for movement, it uses the training data sets acquired at the second smart city 120 to relearn that learning model and retransmits the relearned learning model to the first multipurpose vehicle 2a transmitting the request for movement.

Further, the server according to the present embodiment is further configured so that when the number of the first multipurpose vehicles 2a of the request for movement is greater than or equal to a predetermined number, when using training data sets acquired at the second smart city 120 to relearn the learning model received from a first multipurpose vehicle 2a, it utilizes part of that learning model as is and learns the remaining part using the training data sets acquired at the second smart city 120 as transfer learning.

By performing transfer learning, as explained above, it is possible to decrease the amount of processing required for relearning and shorten the time required for relearning compared with when performing normal learning relearning the entire learning model. For this reason, when there are a large number of the first multipurpose vehicles 2a in the request for movement, it is possible to decrease the processing load of the server 1 and shorten the time required for relearning by performing transfer learning at the time of relearning.

Above, embodiments of the present disclosure were explained, but the above embodiments only show some of the examples of application of the present disclosure and are not meant to limit the technical scope of the present disclosure to the specific constitutions of the above embodiments.

For example, in the above embodiments, a single server 1 was used to perform the various types of processing explained above while referring to FIG. 4 to FIG. 6, but the servers and vehicles 2 can also be configured so that a plurality of servers (for example, a server managing multi-purpose vehicles 2a in the first smart city 110 and a server managing multipurpose vehicles 2b in the second smart city 120) may also be used to perform processing similar to the above-mentioned various types of processing.

Further, in the above embodiments, the explanation was given for the case where a vehicle 2 moves between the first smart city 110 and the second smart city 120, but the disclosure is not limited to this. The number of smart cities may also be three or more. Further, if dividing the first smart city 110 further into smaller sections for operation of the multipurpose vehicles, that is, if the multipurpose vehicles used in each section are fixed, when making the multipurpose vehicles move from a certain section in the first smart city 110 to another section, it is also possible to relearn the learning model optimized corresponding to the properties of the certain section using suitable training data sets corresponding to the properties of the other section.

Further, in the above embodiments, the explanation was given for the case of using a vehicle 2 as an example of the movable or portable equipment, but if other movable equipment or portable equipment is used in a separate area (second area) different from the usual usage area (first area), the server 1 and equipment can also be configured to relearn the learning models mounted in the equipment (learning models optimized in accordance with the properties of the usual usage area) using suitable training data sets corresponding to the properties of the other area.

The invention claimed is:

1. A model learning system comprising a server and a plurality of equipment configured to be able to communicate with the server, wherein
    the server determines whether a number of vehicles in a second area is greater than a threshold, and transmits a request for movement from a first area to the second area to first equipment in response to determining that the number of vehicles in the second area is not greater than the threshold,
    the server determines whether an amount of training data sets acquired in the second area becomes greater than or equal to a predetermined learning start amount, and in response to determining that, among the plurality of equipment, the first equipment including a supervised machine learning model learned using training data sets acquired in the first area is used in the second area and determining that the amount of training data sets acquired in the second area becomes greater than or equal to the predetermined learning start amount, the server uses the training data sets acquired in the second area to relearn the supervised machine learning model included in the first equipment,
    wherein the training data sets acquired in the second area include measured values of input parameters acquired in the second area and measured values of output parameters corresponding to the measured values of the input parameters,
    the first equipment is a self driving vehicle,
    when receiving a request for movement from the first area to the second area, the first equipment makes the first equipment move from the first area to the second area based on the request for movement and transmits the supervised machine learning model included in the first equipment to the server and,
    when receiving the supervised machine learning model from the first equipment which transmitted the request for movement, the server relearns the received supervised machine learning model using training data sets acquired in the second area and retransmits the relearned supervised machine learning model to the first equipment which received the request for movement.

2. The model learning system according to claim 1, wherein,
    when a number of first equipment making the request for movement is greater than or equal to a predetermined number and the server relearns one or more supervised machine learning models received from the first equipment using training data sets acquired in the second area, the server uses parts of the one or more supervised machine learning models as is and relearns the remaining parts using training data sets acquired in the second area as transfer learning.

* * * * *